United States Patent
Claise et al.

(10) Patent No.: US 8,156,233 B2
(45) Date of Patent: Apr. 10, 2012

(54) STREAMING OF TEMPLATES AND DATA RECORDS IN INDIVIDUAL STREAMS USING A MULTISTREAM PROTOCOL

(75) Inventors: Benoit Claise, Crisnee (BE); Andrew Johnson, Coldstream (GB); Paul Aitken, West Linton Peeblesshire (GB); Randall Stewart, Chapin, SC (US); Peter Lei, Arlington Heights, IL (US)

(73) Assignee: Cisco Technology, Inc., San Jose, CA (US)

( * ) Notice: Subject to any disclaimer, the term of this patent is extended or adjusted under 35 U.S.C. 154(b) by 956 days.

(21) Appl. No.: 11/697,609

(22) Filed: Apr. 6, 2007

(65) Prior Publication Data

US 2008/0250153 A1    Oct. 9, 2008

(51) Int. Cl.
*G06F 15/16* (2006.01)

(52) U.S. Cl. ..... 709/231; 709/232; 370/230; 370/230.1; 370/232

(58) Field of Classification Search .......... 709/231–232; 370/230–232

See application file for complete search history.

(56) References Cited

U.S. PATENT DOCUMENTS

| | | | | |
|---|---|---|---|---|
| 5,339,421 | A * | 8/1994 | Housel, III | 719/328 |
| 6,434,624 | B1 * | 8/2002 | Gai et al. | 709/232 |
| 7,318,194 | B2 * | 1/2008 | Achilles et al. | 715/237 |
| 7,385,974 | B2 * | 6/2008 | Elzur | 370/389 |
| 2004/0064587 | A1 * | 4/2004 | Leung | 709/246 |
| 2005/0091307 | A1 * | 4/2005 | Venkatsubra et al. | 709/203 |
| 2006/0256719 | A1 * | 11/2006 | Hsu et al. | 370/230 |
| 2008/0228932 | A1 * | 9/2008 | Monette et al. | 709/229 |

OTHER PUBLICATIONS

G. Sadasivan, et al., "Architecture for IP Flow Information Export", Internet-Draft, Sep. 6, 2006, 30 pages. Copyright (C) The Internet Society (2006).

J. Quittek, et al., "Information Model for IP Flow Information Export", Internet-Draft, Feb. 24, 2007, 159 pages. Copyright (C) The IETF Trust (2007).

B. Claise, et al., "Specification . . . IPFIX Protocol . . . Exchange . . . Information", Internet-Draft, Nov. 2006, 54 pages. Copyright (C) The Internet Society (2006).

Tanja Zseby, et al., "IPFIX Applicability", Internet-Draft, Feb. 2007, 31 pages. Copyright (C) The IETF Trust (2007).

E. Boschi, et al., "IPFIX Implementation Guidelines", Internet-Draft, Feb. 9, 2007, 34 pages. Copyright (C) The IETF Trust (2007).

(Continued)

*Primary Examiner* — Duyen Doan
(74) *Attorney, Agent, or Firm* — Fish & Richardson P.C.

(57) ABSTRACT

In one embodiment, a method includes determining a first template defining a data format for one or more first data records and a second template defining a data format for one or more second data records. The template may be needed to decode the information included in an associated data record. The first template is sent on a first stream of a multi-stream protocol in an ordered fashion, such as SCTP. The one or more first data records are also sent on the first stream in an ordered fashion and include first flow information for data sent through a network device. A second template is sent on a second stream using the multi-stream protocol in an ordered fashion. One or more second data records are sent on the second stream including second flow information for data sent through the network device.

18 Claims, 4 Drawing Sheets

OTHER PUBLICATIONS

E. Boschi, et al., "Reducing Redundancy in IPFIX and PSAMP Reports", Internet-Draft, Feb. 28, 2007, 30 pages. Copyright (C) The IETF Trust (2007).

B. Trammell, et al., "Bidirectional Flow Export using IPFIX", Internet-Draft, Mar. 2, 2007, 20 pages. Copyright (C) The IETF Trust (2007).

C. Schmoll, et al., "IP Flow Information eXport (IPFIX) Testing", Internet-Draft, Oct. 16, 2006, 19 pages. Copyright (C) The Internet Society (2006).

T. Dietz, et al., "Definitions of Managed Objects . . . Flow Information Report", Internet-Draft, Feb. 23, 2007, 45 pages. Copyright (C) The IETF Trust (2007).

J. Quittek, et al., "Requirements for IP Flow Information Export (IPFIX)", Oct. 2004, 31 pages. Copyright (C) The Internet Society (2004).

S. Leinen, et al., "Evauation of Candidate Protocols . . . Information Export (IPFIX)", Oct. 2004, 22 pages. Copyright (C) The Internet Society (2004).

B. Claise, et al., "Cisco Systems NetFlow Services Export Version 9", Oct. 2004, 31 pages. Copyright (C) The Internet Society (2004).

"IP Flow Information Export (ipfix)", Mar. 6, 2007, 4 pages—http://www.ietf.org/html.charters/ipfix-charter.html.

\* cited by examiner

STREAMING OF TEMPLATES AND DATA RECORDS IN INDIVIDUAL STREAMS USING A MULTISTREAM PROTOCOL

TECHNICAL FIELD

Particular embodiments generally relate to networking.

BACKGROUND

In Internet Protocol (IP) Flow Information eXport (IPFIX), IP traffic measurements for flows are exported using a TLV (type, length, value) format. The information is exported using a template record that is sent once to export the {type, length} pairs that define a data format for one or more data records that are sent for a flow. The data records include values for the flow.

In IPFIX, all template records are sent reliably on a Stream Control Transmission Protocol (SCTP) association on stream 0. Data records are sent partially reliably on another stream or unreliably on yet another stream. The data records sent in a single stream may be associated with multiple templates.

A collector device must have received the template record associated with the data records to decode the information in the data records. However, because the template is sent on a different stream from the corresponding data records, the template may not be received before the data records. For example, a template may be blocked pending reliable transmission on stream 0 while the associated data records may be transmitted immediately in an unreliable message on another stream. Because the collector cannot decode the data records without the template, the data records may be discarded by the collector. Also, due to different stream congestion, it is possible that even if the template and data records are both sent reliably, the data records sent on another stream still might arrive before the template. Again, the collector cannot decode the data records without the template and the data records may be discarded. Also, because data records pertaining to different templates are sent on the same SCTP stream, there is no way of knowing how much data was lost for data records associated with a specific template because the collector cannot determine which template the lost data records were associated with. In some cases, it may be important to know how many data records were lost (e.g., in the case of billing or when sampling is being used), but conventionally IPFIX cannot provide this information.

DESCRIPTION OF EXAMPLE EMBODIMENTS

Overview

In one embodiment, a method includes determining a first template defining a data format for one or more first data records and a second template defining a data format for one or more second data records. The template may be needed to decode the information included in an associated data record. The first template is sent on a first stream of a multi-stream protocol in an ordered fashion, such as SCTP. The one or more first data records are also sent on the first stream in an ordered fashion and include first flow information for data sent through a network device. A second template is sent on a second stream using the multi-stream protocol in an ordered fashion. One or more second data records are sent on the second stream including second flow information for data sent through the network device. Accordingly, the first template and its associated data records are sent on a first stream and the second template and its associated data records are sent on a second stream. Thus, it is ensured that the templates will arrive before the corresponding data records. Further, because each template and the associated data records are sent on a separate stream from other templates and data records, then an accounting as to how many data records were lost per template can be determined.

Example Embodiments

Figure 1:
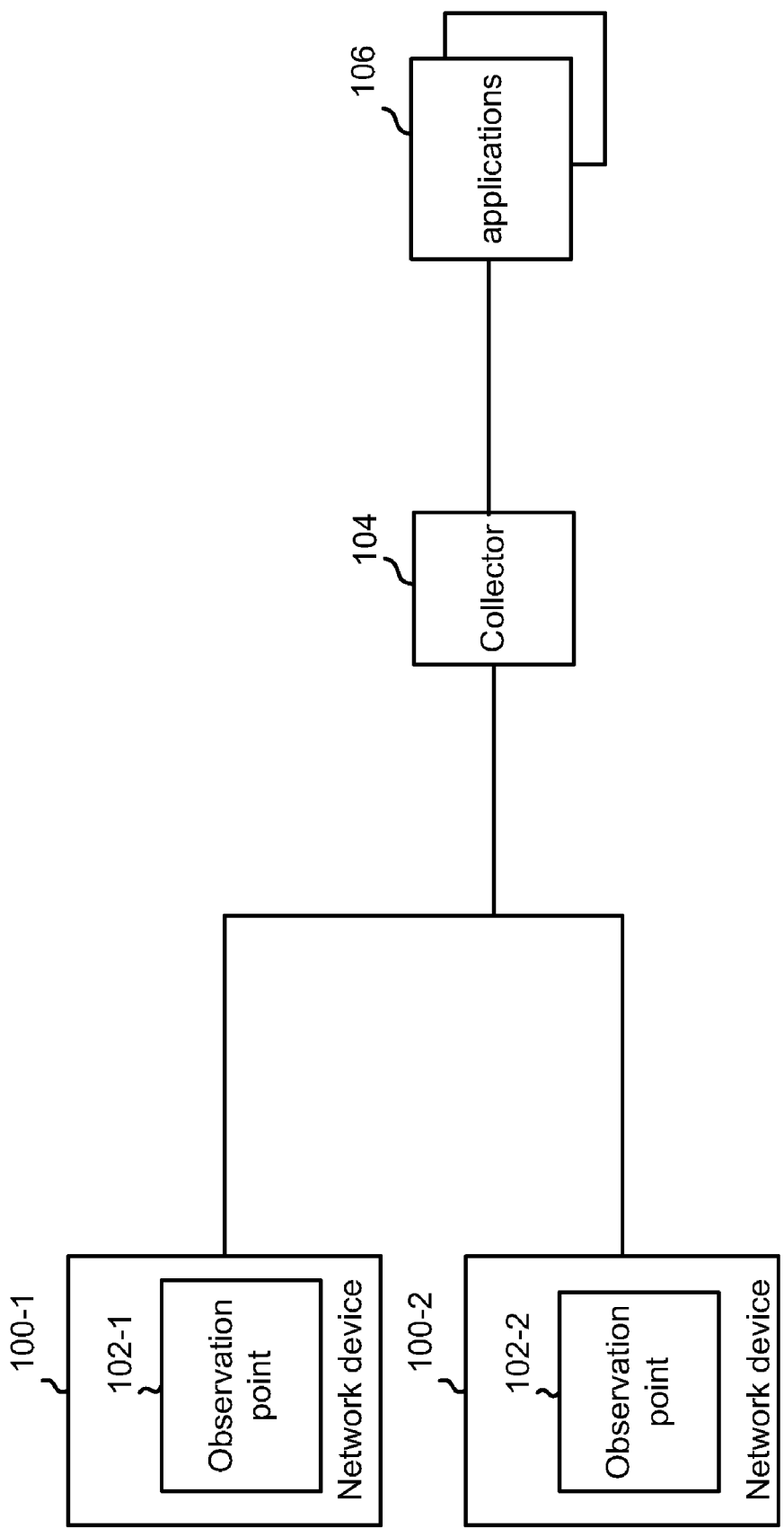
FIG. 1 depicts an example of a system for sending templates and data records.

FIG. 1 depicts an example of a system for sending templates and data records. As shown, network devices 100, a collector 104, and applications 106 are provided.

Network devices 100 may be any suitable network device that can export information. For example, network device 100 includes a router, switch, etc.

Network device 100 includes one or more observation points 102. An observation point may be a location in a network where IP packets can be observed. Examples of observation points 102 include a line to which a probe is attached, a shared medium, a single port of network device 100, a set of interfaces (physical or logical) of network device 100, etc.

Network devices 100 may export information for flows to collectors 104. The information for a flow may be any information that is measured for the flow. In one embodiment, a flow may be defined as a set of IP packets passing through an observation point 102 in a network during a certain time interval. All packets belonging to a particular flow have a common set of properties. The properties may include packet header fields, characteristics of the packet itself, one or more fields derived from the packet treatment, etc. A packet belongs to a flow if it satisfies properties defined for the flow.

The information for a flow is sent in a {type, length, value} format using a template and one or more data records. The template defines {type, length} pairs while {values} are exported in data records. The template may be an ordered sequence of {type, length} pairs that specify a structure and semantics of a particular set of information that needs to be communicated from network device 100 to collector 104. Each template may be uniquely identified by a template ID. The data records include {values} for the {type, length} pairs. Although this format is described, it will be understood that other formats may be appreciated. However, in the other formats, the template still defines the structure of the data that is sent in the data records.

Collector 104 receives the template and data records and can decode the data records using the template. The decoding involves referring to the type/length pairs in the template to determine the values in the data records. Collector 104 may process the information for applications 106 that need the information exported. Examples of applications 106 include usage-based accounting, traffic engineering, attack/intrusion detection, quality of service (QoS) monitoring, etc. applications. Although one collector 104 is shown, it will be understood that any number of collectors may be used.

The templates and data records may be sent using Stream Control Transmission Protocol (SCTP) with the Partial Reliability Extension. SCTP is described in request for comment (RFC) 2960 and 3758, both of which are incorporated by reference for all purposes. SCTP can transport multiple message streams. Thus, it is considered a multi-streaming protocol that can transmit several independent streams of messages in parallel. Although SCTP is described, it will be understood that any protocol in which multiple streams can be sent may be used. For example, a single streaming protocol may be used to create multiple streams. In one example, five transmission control protocol (TCP) connections may be created to send templates and data records.

Particular embodiments send templates and the templates' associated data records on individual streams. For example, a first template and first data records may be sent on stream 0 and a second template and second data records may be sent on stream 1. In one embodiment, no other templates and their associated data records are sent on stream 0 or 1. Accordingly, streams are dedicated for a specific template record and its associated data records. Although the description describes a single template and its associated data records, multiple templates may be sent on a single stream. In this case, the multiple templates and their associated data records are only sent on that stream. Thus, data records from templates sent on another stream are not sent on that stream.

Different templates may be created for different flow definitions. Thus, in one embodiment, each template is associated with a different flow definition. A flow definition may classify packets into flows where information from the packets is used to create data records associated with a template. The information for the flow may be measured properties of the flow, such as a total number of bytes for all the flow's packets and also characteristic properties of the flow (e.g., a source IP address and protocol).

In one example, a flow definition specifies keys fields. Key fields may be properties for packets. Key fields in table I are the scr address (source IP address) and prot (protocol) fields.

TABLE I

| src address | prot | length | flow |
| --- | --- | --- | --- |
| 192.168.0.1 | TCP | 50 | 1 |
| 192.168.0.1 | UDP | 75 | 2 |
| 192.168.0.9 | TCP | 50 | 3 |
| 192.168.0.9 | TCP | 50 | 3 |
| 192.168.0.1 | TCP | 100 | 1 |

The packets that are received that include the same properties found under src address and prot will be grouped in the same flow. For example, the column "flow" shows which flows packets with the properties of src address and prot are grouped in. Thus, a first and fifth packet is grouped in flow 1, the second packet in flow 2, and the third and fourth in flow 3.

Data is also determined for each flow, which may be referred to non-key data. The non-key data in this example is the data in the column labels "length". This is the size of the flow (or packet). The template defines the key and non-key fields for a flow definition. The data records for the template would then carry values for the key and non-key fields.

Accordingly, a first data record for a first template may include first flow information and a second data record for a second template may include second flow information. In one example, the first flow information may be for a first flow and the second flow information may be for a second flow. Using table I, the first flow information may be the information for flow 1 and the second flow information may be the information for flow 2. However, it will be understood that information for the same flow may be sent in data records in different streams or with different templates. For example, two different sets of data records may be created from a flow. The data records may contain different subsets of the data in the flow or may contain the same information but may be used for different purposes (e.g., one comes from a 1:1 sampler for billing, while the other comes from a 1:1000 sampler for capacity planning). The data records may be sent on separate streams, which may allow for estimating the amount of data loss or allow for faster transfer of data records (instead of an ordered delivery of data records for a single flow, a parallel delivery of data records for a single flow is provided). Thus, multiple flow definitions may include the same flow or each flow definition may include different flows. Although the above example is described for determining flow information, it will be understood that any flow information may be used to create data records. As long as templates and their associated data records are sent on the same stream, then any flow information may be included in the data records.

Data records for the flows in a flow definition are then created and sent on the same stream as a template associated with the flow definition. However, it will be understood that the templates may be formatted for information other than flows or may define a data format for multiple flows.

SCTP guarantees ordered transmission of data on a single stream when sending with the "ordered" option. Thus, ordered transmission of a template and its associated data records can be guaranteed, since they are transmitted on a single stream. This ensures that a template is received by collector 104 before its associated data records. In other embodiments, the ordered option may not be used for transmission of data on a stream as long as it is guaranteed that a template is received before data records. Also, once a template is received, the data records may be sent in an unordered fashion. An accounting of lost data records per stream may be determined because data records for only one template are sent on each stream. Thus, lost data records in any particular stream pertain to only one template, so collector 104 can determine exactly how much data was lost for each template.

Figure 2:
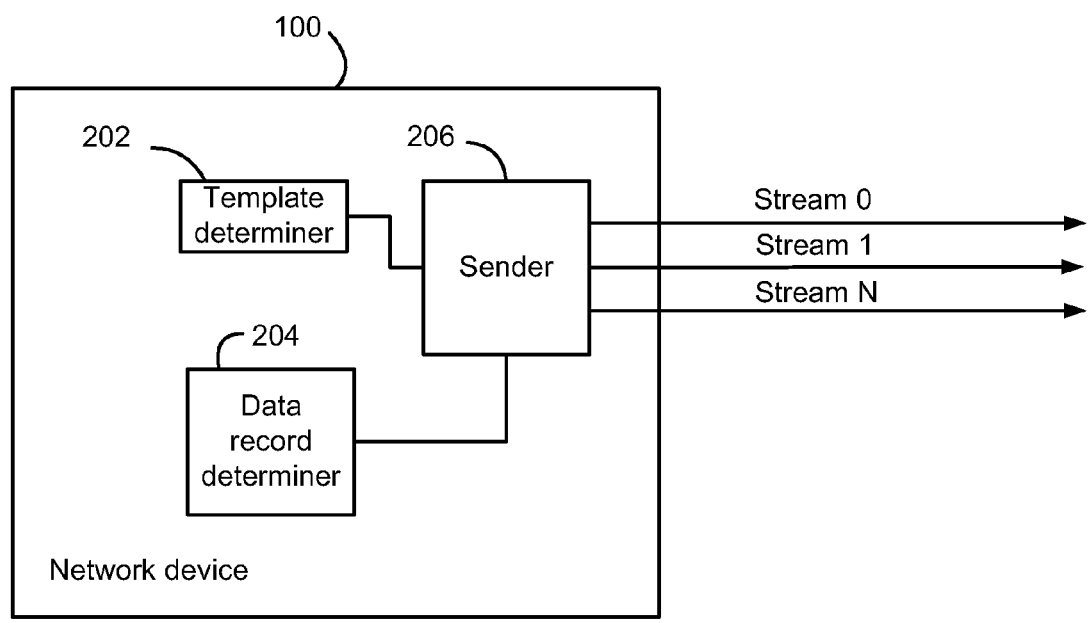
FIG. 2 depicts a more detailed example of a network device.

FIG. 2 depicts a more detailed example of a network device 100. Network device 100 includes a template determiner 202, a data record determiner 204, and a sender 206.

Template determiner 202 is configured to determine information for a template. For example, the {type, length} pairs may be determined for different templates. Different templates may be created for different flow definitions. Thus, in one embodiment, each template is associated with a different flow definition.

Data record determiner 204 is configured to determine information for data records. The information may be determined from a metering process. The metering process may be any process that determines data for data records. For example, packet headers and characteristics observed at observation point 102 and packet treatment at observation point 102 may be used by the metering process to generate data records. A set of functions that includes packet header capturing, time stamping, sampling, and classifying may be used to determine data records for a flow.

Sender 206 is configured to send templates and data records on individual streams. For example, a stream 0, stream 1, and stream N are provided. A template 0 and data records associated with template 0 may be sent on stream 0, a template 1 and its associated data records sent on stream 1, and so on.

Sender 206 may determine how to send the templates and data records. For example, a template may be sent reliably while the data records may be sent reliably, partially reliably, or unreliably, depending on the requirements of an application 106. Data records for flows may be determined over time. The first flow may be identified based on identifying information for packets being forwarded. For example, the source IP address, destination IP address, Differentiated Services Code Point (DSCP), etc may be used to identify packets for a flow. Flow information for the flow is then determined and inserted into data records according to the data format defined by the template. The data records are then sent on the stream assigned to their associated template.

Figure 3:
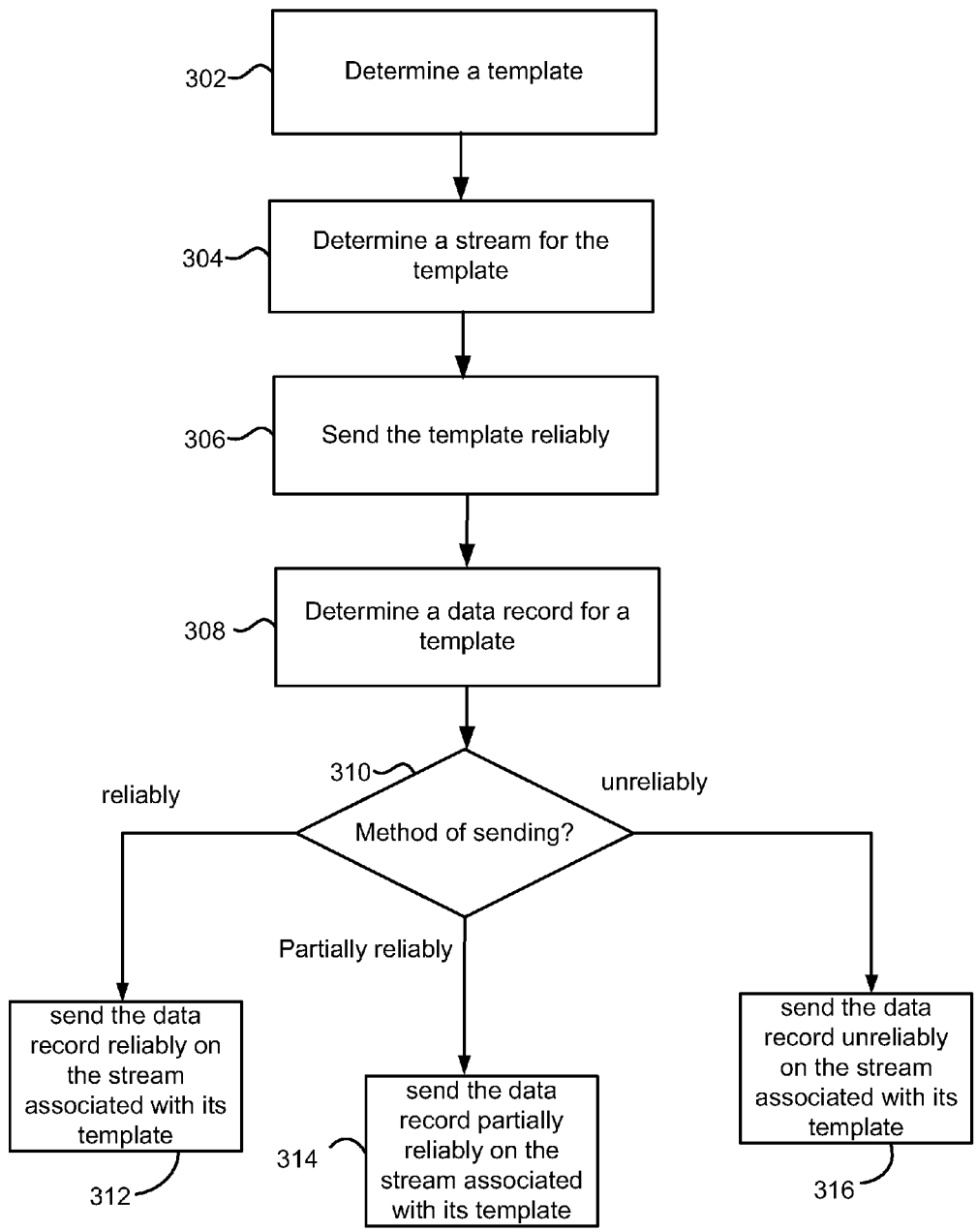
FIG. 3 depicts a simplified flowchart of an example for determining how to send templates and data records.

FIG. 3 depicts a simplified flowchart of an example for determining how to send templates and data records. The following method assumes that there are enough streams to send the templates. However, if there are more templates than streams, streams may be re-used when no more data records are being sent or no data is currently available. Also, templates and data records may be multiplexed on a single stream.

Step 302 determines a template. Step 304 then determines a stream for the template. For example, a stream that has not been associated with another template may be determined.

Step 306 then sends the template reliably. For example, a flag that indicates a message should be sent reliably may be set in a database. Accordingly, the template is sent reliably. When the term reliably is used, it is when some guarantee of reception of the template is provided. For example, sender 206 may include a persistence quality that ensures the template has been received. For example, error correction, retransmission, handshaking, or other methods may be used to ensure that a template is sent reliably. Sender 206 is persistent in making sure that the template is sent reliably and thus does not stop trying to send the template until it is known to have been received. Also, sender 206 may wait until it is possible to send the template reliably. Sending the template reliably is important because the template is needed to decode any data records corresponding to the template. Thus, if the template is not received, then collector 104 cannot decode any corresponding data records sent.

Step 308 determines a data record for a template. Step 310 determines how to send the data record. The decision on how to send the data record may be based on application requirements, congestion, or any other factors. Also, the data record is not sent until a template has been sent reliably. Different data records may be sent differently. For example, for the same stream, data records may be sent reliably, partially reliably, or unreliably. The decision on how to send the data records may be determined on a per message basis. Also, the data records may be sent using methods other than reliably, partially reliably, or unreliably.

Step 312 may send the data record reliably. Step 314 may send the data record partially reliably. Partially reliably may be a timed reliability service. This service indicates a limit on the duration of time that sender 206 should try to transmit/retransmit the message. For example, during the time limit, sender 206 may attempt to transmit or retransmit the data record until it is confirmed it has been received. Once the time limit ends, attempts to transmit the data record stop. Also, other partially reliable methods may be used. For example, a number of retransmissions may be attempted before abandoning transmission, the size of an outbound queue, etc.

Step 316 may also send the data record unreliably. In this case, the data record may be sent and there are no mechanisms in place to determine if it is received by collector 104.

Figure 4:
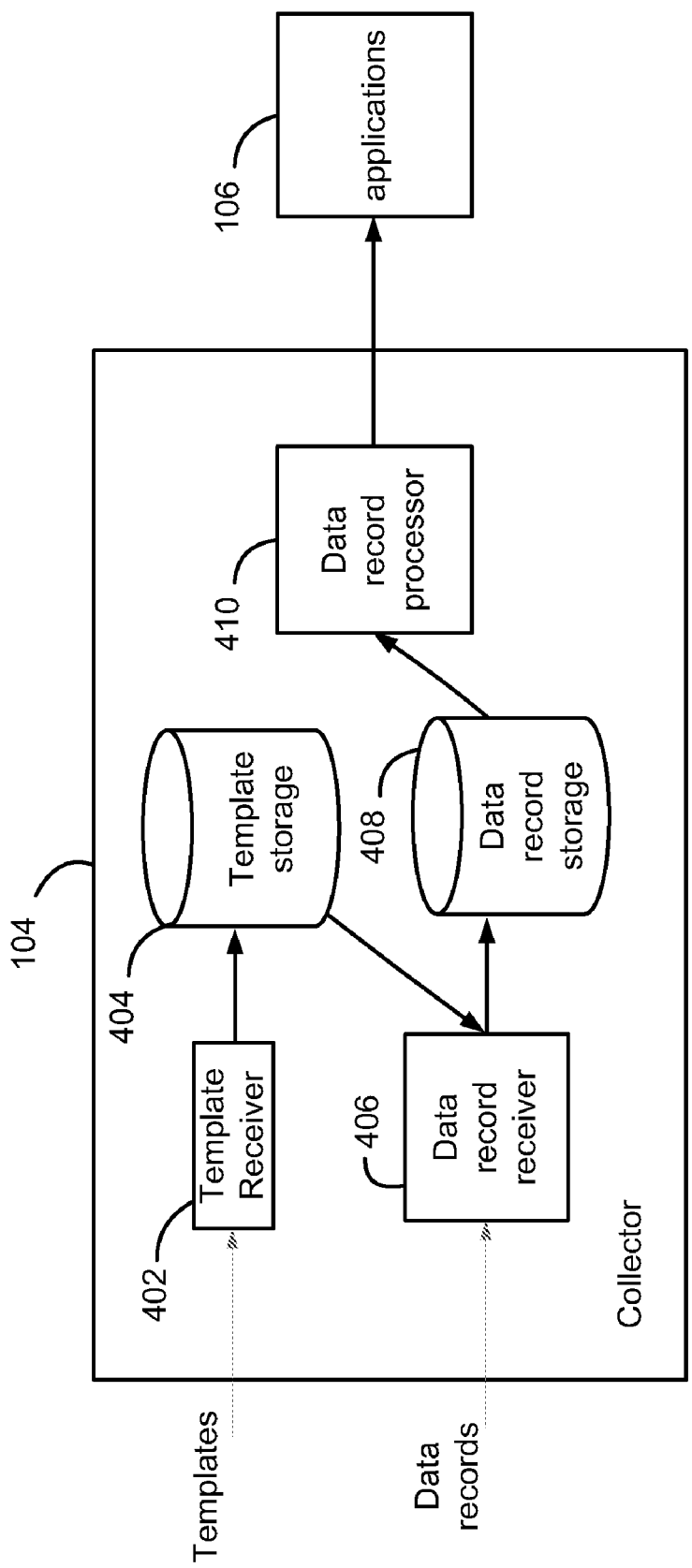
FIG. 4 depicts a more detailed example of a collector.

As the template and data records are sent, collector 104 may process the data records and templates. FIG. 4 depicts a more detailed example of a collector 104. Collector 104 includes a template receiver 402, template storage 404, a data record receiver 406, data record storage 408, and a data processor 410.

Template receiver 402 is configured to receive templates. The templates may be received on different streams. Template receiver 402 then stores the templates in template storage 404. For example, different templates may be identified by different template IDs. The templates may be identified in template storage 404 using the template IDs.

Data record receiver 406 is configured to receive data records. As discussed above, the data records may be received on individual streams based on the templates in which the data records are associated.

Data record receiver 406 may decode the data records using a template from template storage 404. For example, a template ID in the data record may be used to determine a template in template storage 404. The information in the data record may then be decoded using the template. For example, the {values} in the data record may be decoded according to the {type, length} pairs found in the template. The decoded information may be stored in data record storage 408.

At any point, the data records may be further processed. For example, data processor 410 may process the data records for applications 106. The processing may include sending the data records to an application 106 for any purpose. Also, data processor 410 may analyze the data records to determine information such as which data records have been lost, etc. For example, because all the data records pertaining to a single template were sent on the same stream, data processor 410 can determine which ones have been lost. In one example, sequence numbers may be included in packets sent in a stream. Thus, the number of packets that have been lost per template may be determined. Further, the number of data records included in a packet may also be noted. Thus, the number of data records lost may be determined. Also, if multiple metering processes are using the same template, sending each metering process's template record and corresponding data records on the same stream allows each metering process to report how much of its data has been lost. Also, knowing the number of data records lost may be important for certain applications, such as billing applications, or when sampling is being used. This may be important in different examples of use. For example, each template could represent an individual entity (customer, system, network, application, etc.). Each entity might want an accounting of how much data was lost per template. Sending templates and corresponding data records on the same streams allows data processor 410 to calculate an error window per entity—e.g., how much revenue was unbilled per customer or the maximum amount of traffic per network.

Although the description has been described with respect to particular embodiments thereof, these particular embodiments are merely illustrative, and not restrictive. For example, protocols other than SCTP may be used and also information other than flow information may be exported.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that which is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
   determining a first template defining a first data format including a first type and a first length for one or more first data records that carry first values for the first type and the first length, and a second template defining a second data format including a second type and a second length for one or more second data records that carry second values for the second type and the second length;
   sending the first template on a first stream of a plurality of streams using a multi-streaming protocol that supports transmission of a plurality of independent messages in parallel on the plurality of streams, wherein the one or more first data records are sent on the first stream after the first template is sent, and include first flow information for data sent through a network device; and
   sending the second template on a second stream of the plurality of streams using the multi-streaming protocol, wherein the one or more second data records are sent on the second stream after the second template is sent, and include second flow information for data sent through the network device, wherein the first template is needed by a collector to process the one or more first data records or the second template is needed by the collector to process the one or more second data records.

2. The method of claim 1, wherein the first template and/or second template are sent reliably.

3. The method of claim 1, wherein the one or more first data records and/or one or more second data records are sent reliably, partially reliably, and/or unreliably.

4. The method of claim 1, further comprising adding information to the one or more first data records or one or more second data records such that a number of lost data records can be determined independently on the first stream or the second stream.

5. The method of claim 1, wherein the first flow information is for a first set of one or more flows through the network device and the second flow information is for a second set of one or more flows through the network device.

6. The method of claim 1, wherein the one or more first data records are sent in an unordered fashion in the first stream after the first template is sent, and wherein the one or more second data records are sent in an unordered fashion in the second stream after the second template is sent.

7. A method, comprising:
receiving a first template on a first stream of a plurality of streams using a multi-streaming protocol that supports transmission of a plurality of independent messages in parallel on the plurality of streams, wherein one or more first data records are received on the first stream after the first template is received, and include first flow information for data received through a network device;
receiving a second template on a second stream of the plurality of streams using the multi-streaming protocol, wherein one or more second data records are received on the second stream after the second template is received, and include second flow information for data received through the network device;
using the first template to determine a first data format including a first type and a first length for the one or more first data records that carry first values for the first type and the first length;
processing the one or more first data records using the determined first data format;
using the second template to determine a second data format including a second type and a second length for the one or more second data records that carry second values for the second type and the second length; and
processing the one or more second data records using the determined data format.

8. The method of claim 7, further comprising determining if any of the one or more first data records or one or more second data records were not received.

9. The method of claim 7, wherein the one or more first data records or one or more second data records are processed by an application.

10. An apparatus, comprising:
one or more processors; and
logic encoded in one or more memory device for execution by the one or more processors, and when executed operable to:
determine a first template defining a first data format including a first type and a first length for one or more first data records that carry first values for the first type and the first length, and a second template defining a second data format including a second type and a second length for one or more second data records that carry second values for the second type and the second length;
send the first template on a first stream of a plurality of streams using a multi-streaming protocol that supports transmission of a plurality of independent messages in parallel on the plurality of streams, wherein the one or more first data records are sent on the first stream after the first template is sent, and include first flow information for data sent through a network device; and
send the second template on a second stream of the plurality of streams using the multi-streaming protocol, wherein the one or more second data records are sent on the second stream after the second template is sent, and include second flow information for data sent through the network device, wherein the first template is needed by a collector to process the one or more first data records or the second template is needed by the collector to process the one or more second data records.

11. The apparatus of claim 10, wherein the first template and/or second template are sent reliably.

12. The apparatus of claim 10, wherein the one or more first data records and/or one or more second data records are sent reliably, partially reliably, and/or unreliably.

13. The apparatus of claim 10, wherein the logic when executed is further operable to add a sequence number to the one or more first data records or one or more second data records such that a number of lost data records can be determined on the first stream or the second stream.

14. The apparatus of claim 10, wherein the first flow information is for a first set of one or more flows through the network device and the second flow information is for a second set of one or more flows through the network device.

15. The apparatus of claim 10, the one or more first data records are sent in an unordered fashion in the first stream after the first template is sent, and wherein the second template and the one or more second data records are sent in an unordered fashion in the second stream after the second template being is sent.

16. An apparatus, comprising:
one or more processors; and
logic encoded in one or more memory device for execution by the one or more processors, and when executed operable to:
receive a first template on a first stream of a plurality of streams using a multi-streaming protocol that supports transmission of a plurality of independent messages in parallel on the plurality of streams, wherein one or more first data records are received on the first stream after the first template is received, and include first flow information for data received through a network device;
receive a second template on a second stream of the plurality of streams using the multi-streaming protocol, wherein one or more second data records are received on the second stream after the second template is received, and include second flow information for data received through the network device;

use the first template to determine a first data format including a first type and a first length for the one or more first data records that carry first values for the first type and the first length;

process the one or more first data records using the determined first data format;

use the second template to determine a second data format including a second type and a second length for the one or more second data records that carry second values for the second type and the second length; and process the one or more second data records using the determined data format.

17. The apparatus of claim 16, wherein the logic when executed is further operable to determine if any of the one or more first data records or one or more second data records were not received.

18. The apparatus of claim 16, wherein the one or more first data records or one or more second data records are processed by an application.

* * * * *